United States Patent
Pan et al.

(10) Patent No.: US 11,521,485 B2
(45) Date of Patent: Dec. 6, 2022

(54) AUTOMATED VEHICLE CONTROL DISTRIBUTED NETWORK APPARATUSES AND METHODS

(71) Applicant: LEMKO CORPORATION, Schaumburg, IL (US)

(72) Inventors: Shaowei Pan, Kildeer, IL (US); Brian Ponte, Palatine, IL (US)

(73) Assignee: LEMKO CORPORATION, Schaumburg, IL (US)

( * ) Notice: Subject to any disclaimer, the term of this patent is extended or adjusted under 35 U.S.C. 154(b) by 329 days.

(21) Appl. No.: 16/987,399

(22) Filed: Aug. 7, 2020

(65) Prior Publication Data

US 2021/0366273 A1 Nov. 25, 2021

Related U.S. Application Data

(60) Provisional application No. 63/029,542, filed on May 24, 2020.

(51) Int. Cl.
*G08G 1/00* (2006.01)
*G08G 1/01* (2006.01)
(Continued)

(52) U.S. Cl.
CPC ........... *G08G 1/0116* (2013.01); *G06N 20/00* (2019.01); *G08G 1/0133* (2013.01); *G08G 1/0145* (2013.01); *G08G 1/0175* (2013.01)

(58) Field of Classification Search
CPC .. G08G 1/0116; G08G 1/0133; G08G 1/0145; G08G 1/0175; G08G 1/04;
(Continued)

(56) References Cited

U.S. PATENT DOCUMENTS 10,640,104 B2 * 5/2020 Liu .................. B60W 30/1882
2015/0241226 A1 8/2015 Engelman et al.

FOREIGN PATENT DOCUMENTS

KR 1020190109608 A 9/2019
WO WO2016198816 A1 12/2016

OTHER PUBLICATIONS

Jiadai Wang et al., Networking and Communications in Autonomous Driving: A Survey, IEEE Communications Surveys & Tutorials, DOI 10.1109/COMST.2018.2888904, pp. 1-32.
(Continued)

*Primary Examiner* — Ian Jen
(74) *Attorney, Agent, or Firm* — Cygan Law Offices P.C.; Joseph T. Cygan

(57) ABSTRACT

An automated vehicle control distributed network node, that includes at least two modems for communicating with two neighboring roadside nodes on the same side of the roadway; at least one antenna for communicating with vehicles via a wireless connection; pattern recognition processing operative to detect patterns using image data from a plurality of high speed, high resolution video cameras that include night vision; vehicle prediction processing, operatively coupled to the pattern recognition processing, operative to predict vehicle location, velocity and direction using the pattern recognition processing; and a vehicle controller, operatively coupled to the vehicle prediction processing to receive vehicle prediction data, and to the at least one antenna, operative to send acceleration, deceleration and steering control signals to a plurality of vehicles in response to vehicle prediction data received from the vehicle prediction processing.

20 Claims, 13 Drawing Sheets

(51) Int. Cl.
    *G08G 1/017* (2006.01)
    *G06N 20/00* (2019.01)
(58) Field of Classification Search
    CPC .............. G06N 20/00; B60W 2420/42; B60W 2552/10; B60W 2556/45; B60W 60/00184
    See application file for complete search history.

(56) References Cited

OTHER PUBLICATIONS

Prashant Singh, et al., Movement of Autonomous Vehicles in Work Zone Using New Pavement Marking: A new Approach, Journal of Transportation Technologies, DOI: 10.4236/jtts.2020.103012, May 11, 2020, pp. 183-197.
PCT International Search Report, PCT/US2021/033774 (dated Sep. 21, 2008).
PCT Written Opinion of the International Searching Authority, PCT/US2021/033774 (dated Sep. 21, 2008).
Karim Nice, Tracy V. Wilson & Gerald Gurevich, "How Digital Cameras Work" (Nov. 29, 2006) HowStuffWorks.com, (available at: https://electronics.howstuffworks.com/cameras-photography/digital/digital-camera3.htm) {last visited: Oct. 3, 2022}.

* cited by examiner

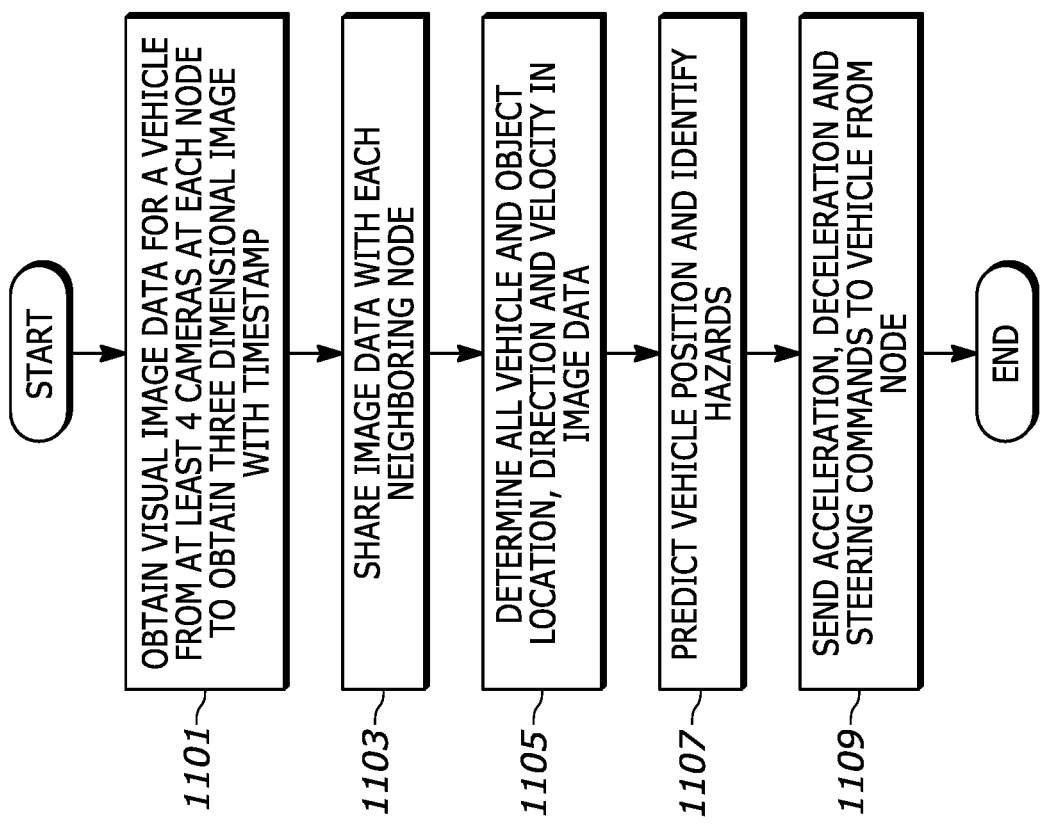

AUTOMATED VEHICLE CONTROL DISTRIBUTED NETWORK APPARATUSES AND METHODS

CROSS-REFERENCE TO RELATED APPLICATIONS

The present application claims priority to U.S. Provisional Patent Application No. 63/029,542, filed May 24, 2020, entitled "AUTOMATED VEHICLE CONTROL DISTRIBUTED NETWORK APPARATUSES AND METHODS" which is hereby incorporated by reference herein in its entirety, and which is assigned to the same assignee as the present application.

FIELD OF THE DISCLOSURE

The present disclosure relates generally to the Internet-of-things (IoT) and more particularly to automated vehicle control methods and apparatuses.

BACKGROUND

The Society of Automotive Engineers (SAE) has defined automation levels for automated vehicle systems that include capabilities such as execution of steering, acceleration and deceleration, monitoring of the driving environment, fallback performance of dynamic driving tasks and system capability defined by driving modes such as conditional automation, high automation and full automation (SAE Level 5). In SAE Level 5 automation, an automated driving system performs all aspects of the dynamic driving task under all roadway and environment conditions that can be managed by a human driver. Existing automated driving systems are based on in-vehicle artificial intelligence (AI) systems. However, SAE Level 5 is not achievable with existing in-vehicle AI systems.

BRIEF DESCRIPTION OF THE DRAWINGS

FIG. 11 is a flow chart showing a method of operation of an automated vehicle control distributed network in accordance with various embodiments.

DETAILED DESCRIPTION

Figure 1:
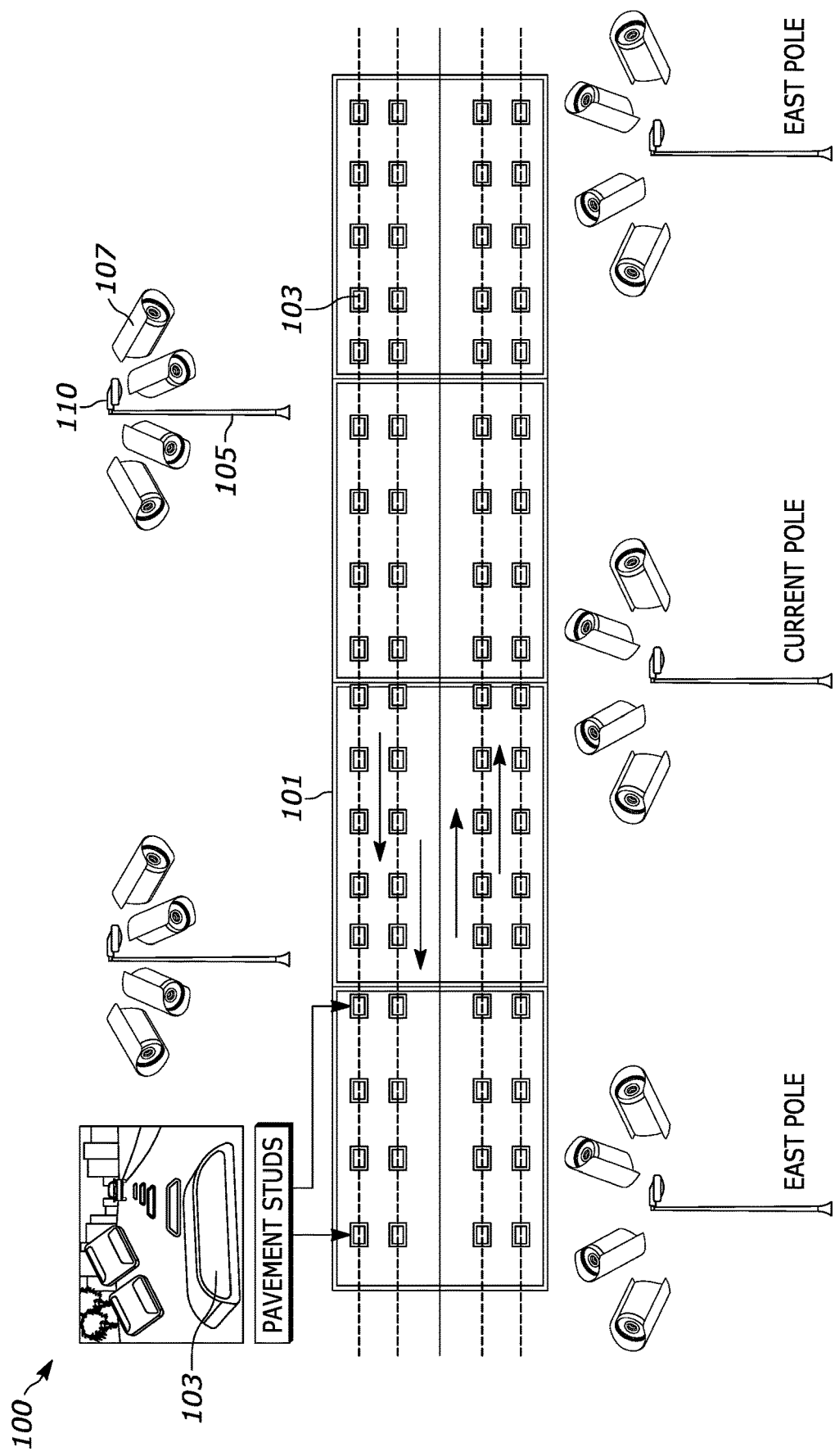
FIG. 1 is a diagram of a roadway with an automated vehicle control distributed network in accordance with various embodiments.

Briefly, the present disclosure provides an automated vehicle control distributed network that enables a full-automation, automated driving system that performs all aspects of dynamic driving tasks under all roadway and environment conditions without any interaction or control by a human driver. The disclosed automated vehicle control distributed network enables evolution from SAE Level 2 automation to SAE Level 5 automation.

The disclosed automated vehicle control distributed network enables detection of environment surrounding a vehicle including, but not limited to, surrounding object speed, location and direction. Such surrounding objects may include, but are not limited to, humans, animals, construction vehicles, other vehicles, etc. All road conditions are detected in three dimensions (3D) including, but not limited to, potholes, ice, other objects, etc.

The present disclosure provides an automated vehicle control distributed network node, that includes at least two modems for communicating with two neighboring roadside nodes on the same side of the roadway; at least one antenna for communicating with vehicles via a wireless connection; pattern recognition processing operative to detect patterns using image data from a plurality of high speed, high resolution video cameras that include night vision; vehicle prediction processing, operatively coupled to the pattern recognition processing, operative to predict vehicle location, velocity and direction using the pattern recognition processing; and a vehicle controller, operatively coupled to the vehicle prediction processing to receive vehicle prediction data, and to the at least one antenna, operative to send acceleration, deceleration and steering control signals to a plurality of vehicles in response to vehicle prediction data received from the vehicle prediction processing. The disclosed automated vehicle control distributed network enables evolution from SAE Level 2 automation to SAE Level 5 automation.

In some embodiments, the automated vehicle control distributed network node may include at least one high-speed high-resolution video cameras that include night vision, operatively coupled to the pattern recognition processing. The automated vehicle control distributed network node may further include at least a third modem for communicating with a third neighboring node across the roadway. The automated vehicle control distributed network node may further include a radio, distributed core network and vehicle processing, operatively coupled to the at least two modems, to the at least one antenna, and to the vehicle controller. The vehicle prediction processing may be implemented using a machine learning algorithm.

The present disclosure also provides an automated vehicle control distributed network, that includes a plurality of operatively coupled automated vehicle control distributed network nodes.

In some embodiments, the pattern recognition processing is further operative to detect missed points from the node image using image data from a neighboring node's cameras. The radio, distributed core network and vehicle processing may include a 4th generation (4G) and (5th generation) (5G) radio access component and associated distributed 4G and/or 5G core networks.

The present disclosure provides a method of operation that includes: obtaining high speed, high resolution video data from a plurality of roadway cameras; determining vehicle location, direction and velocity for at least one vehicle using the high speed, high resolution video data; predicting position of the at least one vehicle; and sending acceleration, deceleration and steering commands to the vehicle based on the predicted position.

The method may further include obtaining the high speed, high resolution video data from at least one camera, mounted on a plurality of roadside poles, to obtain a three-dimensional image with timestamps. The method may further include performing image correction on the three-dimensional image to generate a corrected image; and determining vehicle location, direction and velocity for at least one vehicle using the corrected image. The method may further include sending the acceleration, deceleration and steering commands to a plurality of vehicles as unicast Internet protocol (IP) packets. The method may further include sending acceleration, deceleration and steering commands to a plurality of vehicles as multicast Internet protocol (IP) packets. The method may further include obtaining environmental data from a plurality of environmental sensors. The method may further include obtaining environmental data from a plurality of environmental sensors via a pavement marker that has the plurality of environmental sensors and a transponder, by communication with the transponder.

The present disclosure provides a method of operation that includes: monitoring a roadway using a plurality of roadway high speed, high resolution cameras to detect vehicles, animals, pedestrians, road anomalies and impediment objects; creating a prediction model for each detected vehicle, animal, pedestrian, road anomaly and impediment object; determining control actions for at least one vehicle based on at least one prediction model; and sending acceleration, deceleration and steering commands to the at least vehicle one based on the determined control actions. The method may further include receiving control feedback via the plurality of roadway high speed, high resolution cameras for the at least one vehicle; and sending adjusted acceleration, deceleration and steering commands to the at least vehicle one based on the control feedback.

The method may further include maintaining a plurality of wireless connections between the at least one vehicle and an automated vehicle control distributed network via a plurality of roadside nodes; and performing continuously a make before break wireless handoff to at least one additional roadside node by the at least one vehicle as the at least one vehicle travels along a roadway such that there is no communication delay between the at least one vehicle and the automated vehicle control distributed network. The method may further include sending the adjusted acceleration, deceleration and steering commands to the at least vehicle redundantly using the plurality of roadside nodes.

Turning now to the drawings wherein like numerals represent like components, FIG. 1 illustrates an automated vehicle control distributed network 100 in accordance with various embodiments. The automated vehicle control distributed network 100 is one type of disclosed apparatus in accordance with various embodiments. The roadway 101 includes pavement markers 103 (or pavement studs) that contain a transponder component such that they may communicate information to various other components of the automated vehicle control distributed network. The transponder may be, for example, radio frequency identification (RFID) or an equivalent transponder communication capability.

The automated vehicle control distributed network includes various poles 105 or towers located at points along both sides of the roadway 101. Each pole 105 includes a set of mounted high speed (i.e., for example, at least 60 fps) high resolution video cameras 107 that include night vision, and a node 110. The cameras 107 of each pole are operatively coupled to, and communicate with, the node 110. The camera 107 view angles are arranged such that they overlap each other with respect to each camera's view along the road. For example, a right-most camera's view on any given pole 105 is arranged such that its view overlaps that of the left-most camera on the pole 105, etc.

In one embodiment, all views of cameras 107 on a pole 105 are combined as one frame of, for example, one long high-resolution rectangle, or a trapezoidal shape. The various camera 107 views cover both sides of the roadway 101. In one embodiment, the multi-camera 107 image may be corrected using keystoning (i.e. applying a keystone correction algorithm) such as by using optical trapezoid correction, digital trapezoid correction or a combination etc. The image processing utilized is 3D image processing and 4D images are generated using frame time stamps. All views of the cameras 107 extend beyond the roadway 101 such that non-vehicle objects are captured such as animals, pedestrians, roadway deformities such as potholes/sinkholes, pavement cracks, pavement buckling, etc. The location of the poles 105 on opposite sides of the road are offset at the midpoint as shown in FIG. 1.

Figure 2:
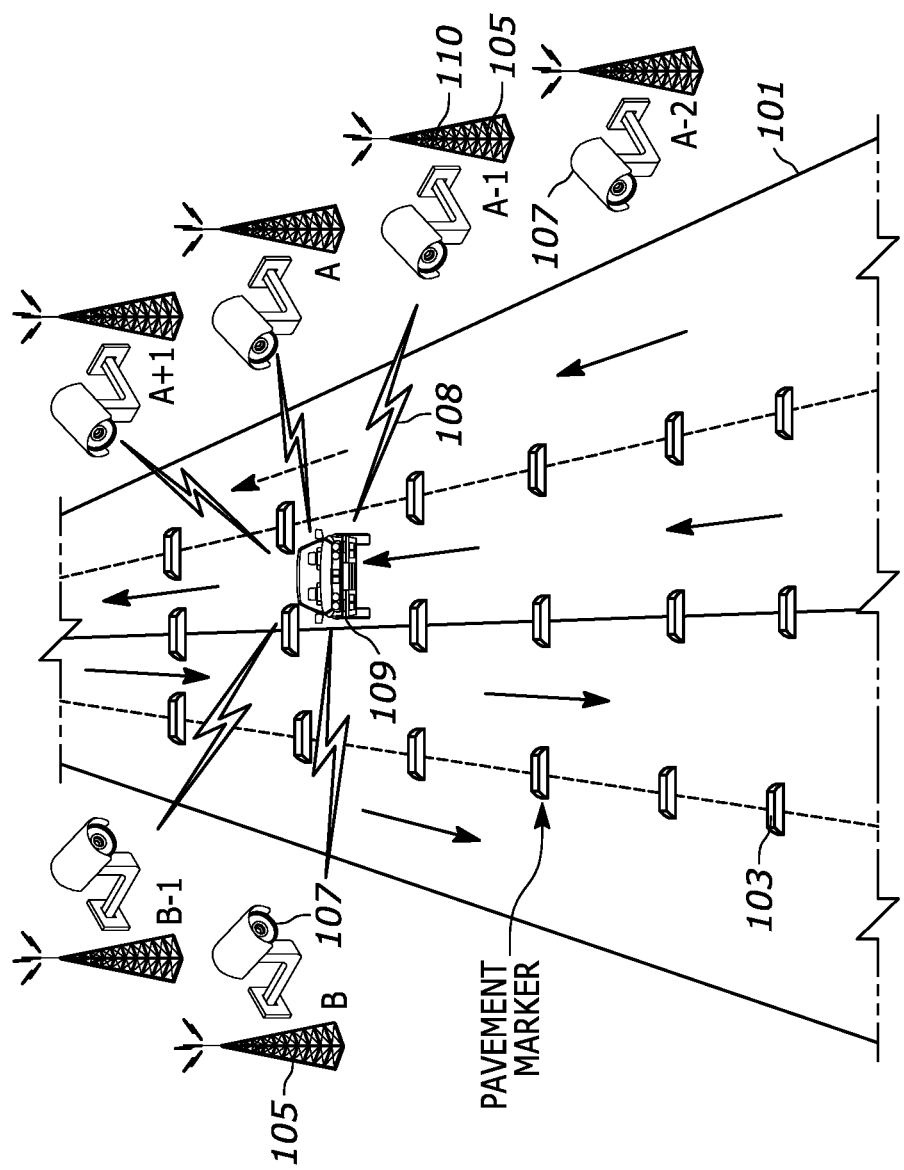
FIG. 2 is a diagram of a roadway as in FIG. 1 and showing an automated vehicle in communication with the automated vehicle control distributed network in accordance with various embodiments.

FIG. 2 is a block diagram of a roadway as in FIG. 1 and showing an automated vehicle 109 in communication with the automated vehicle control distributed network 100 via multiple wireless links 108 in accordance with various embodiments. The automated vehicle control distributed network 100 is operative to recognize each vehicle 109 based upon certain unique points (16, 32, 48, etc.) In some embodiments, if the vehicle 109 make, model, color and license plate number can be detected, then the automated vehicle control distributed network 100 may check a database to get the vehicle size, year, or other information, etc. Otherwise, the automated vehicle control distributed network 100 is operative to use pattern recognition and a database to obtain the vehicle make, model, color, size and year info, etc. by, for example, using the license plate number as an ID of the vehicle. Vehicles that are not automated are also detected by the automated vehicle control distributed network 100 and information may also be retrieved from a database using the same criteria. The transponder enabled pavement markers 103 can be passive or battery active transponders.

The transponder enabled pavement markers 103 are operative to communicate with the nodes 110, and are used by the nodes 110 to calibrate location and provide roadway 101 condition updates such as temperature, moisture, etc. Each pavement marker 103 may therefore also include various environmental sensors such as, but not limited to, temperature, moisture, pressure, etc. Because the roadway 101 expands and contracts with temperature, and may also buckle or have potholes, cracks, or other deformities that may occur such that the precise location of the pavement markers 103 will change periodically over time. Based on pavement marker 103 geo-information detected by the various nodes 110, the automated vehicle control distributed network 100 is operative to recalibrate each location periodically to ensure accuracy.

Vehicle 109 direction and speed is calculated by the nodes 110 for each vehicle 109 using the vehicle 109 ID as detected in adjacent video images and corresponding time stamps. In one example of operation on a roadway with an east-west direction, all vehicle IDs traveling in an east-bound direction will pass and be identified by all adjacent and opposite nodes 110 along the roadway 101 in the east-bound direction and on both sides of the road. This likewise occurs for all west-bound vehicles with respect to adjacent and opposite nodes 110 along the roadway 101 in the west-bound direction.

Each automated vehicle 109 communicates with at least five nodes 110 in a simultaneous manner and performs a radio handoff of at least one of the wireless links 108 from one node 110 to another as it travels such that communication with at least five nodes 110 is always maintained. In other words, a 4+1 wireless link 108 redundancy is maintained. Vehicle control commands such as, but not limited to, acceleration, deceleration and steering commands, can be sent to a vehicle redundantly via each or the redundant wireless links, increasing control command reliability. In one example of a radio handoff operation, the vehicle 109 may initially communicate with node A−2 on the right-most side of the roadway 101 and initiate radio handoff with node A+1 as it travels in the direction of travel arrow shown in FIG. 2. In other words, the vehicle 109 maintains multiple wireless connections with multiple nodes and continuously performs make-before-break radio handoffs as the vehicle 109 travels along a roadway. Each node 110 performs its own prediction of vehicle 109 location and can share this information with each of the other nodes 110. In other words, each node 110 operates independently from other nodes 110 in the distributed network and each node 110 is operative to perform pattern recognition and apply artificial intelligence or machine learning to create a prediction model for a vehicle's location, direction and velocity (and also for non-automated vehicles, unregistered vehicles, other objects, pedestrians, animals, and road deformities) and to send control signals including acceleration, deceleration and steering. The nodes 110 communicate to share data, models, and processing power if needed and thereby enhance redundancy for all automated vehicles. Each node 110 in the distributed network is also operative to gather training data that is used to train machine learning/AI algorithms such as, but not limited to, the pattern recognition and vehicle prediction processing such that these and other machine learning/AI algorithms may be initially trained as well as enhanced by additional collected big data.

Figure 3:
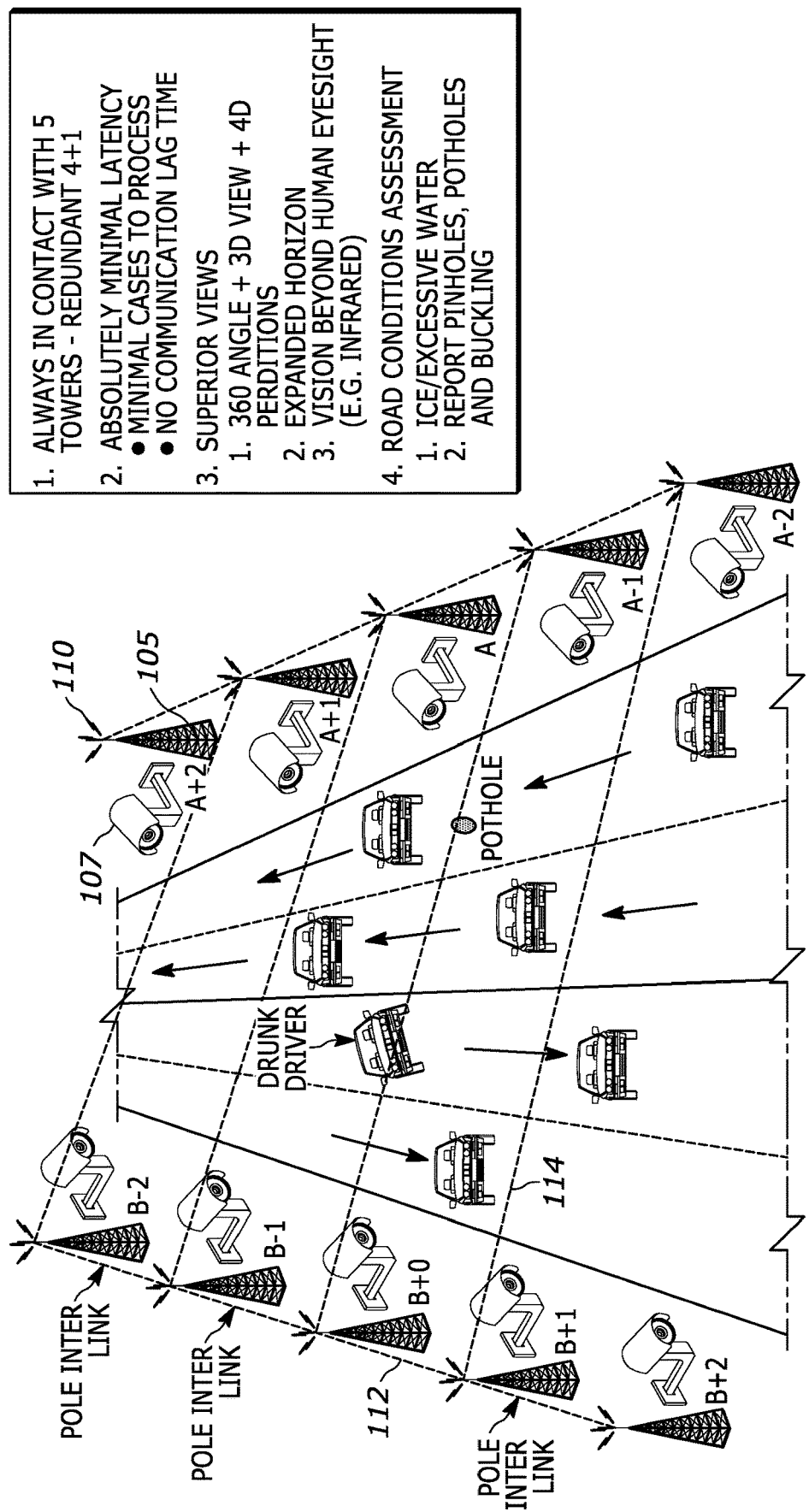
FIG. 3 is a diagram showing various automated vehicles in communication with the automated vehicle control distributed network.

FIG. 3 is a diagram showing a roadway and showing interaction of various automated vehicles with the automated vehicle control distributed network 100 in accordance with various embodiments. Each of the nodes 110 in the automated vehicle control distributed network 100 perform pattern recognition from their respective video images and are operative to identify animals in the area, humans in the area, road changes such as potholes or buckling, motorcycles between lanes, oversized truck loads, etc. Detected objects are modeled at the nodes 110 and stored in databases by at least 16 points including size, weight, maximum speed, hardness, etc. Each modeled object is assigned a unique ID in the originating node 110 and the assigned ID is passed from the originating node 110 to adjacent nodes 110 via wireless or wired communication links 112 between the nodes 110.

Each node 110 is provides a fully distributed network function (Network Function Virtualization—NFV), and contains a 4G/5G radio and core network functions in a 1:1 ratio. Each pole 105 in the automated vehicle control distributed network 100 includes at least one node 110. Each node 110 has its own neighbor list for handovers however the neighbor list does not contain its adjacent node 110. Instead, the neighbor list contains the second adjacent node 110. In one example of handoff groups between nodes 110, a handoff group 1 is Node(2n), n=1, 2, 3, . . . . M; and handoff group 2 is Node(2n+1), n=1, 2, 3, . . . . M. The handoff group1 is set to the same frequency of a first wireless channel and the handoff group 2 is set to the same frequency of a second wireless channel.

Node-to-node communication links include same road-side communication links 112 and crossroad communication links 114 such that a grid or mesh is formed. The communication links 112 and communication links 114 between the nodes 110 may be wired, wireless or a combination of both wired and wireless communication links. The wireless or wired communication links 112 and communication links 114 are set up in the mesh configuration as shown to enable redundancy. Adjacent and opposite nodes 110 are linked. Each node 110 collects all IDs of vehicles and objects within its visual detection area as well as vehicle and object IDs of each neighbor node 110.

For example, in FIG. 3, node A will have all IDs for vehicles and objects it has identified as well as for node A+1, A−1, B, and B−1. All IDs and associated information are combined as one package and include object size, weight, speed, direction, current location, type, time stamp, score, etc. Relevant objects are also assigned a danger score. Road deformities such as detected potholes are assessed for size of the pothole and depth. For vehicles, recent vehicle driving history is evaluated. For example, drunk or reckless driving detected by the pattern recognition is flagged. All vehicle and object IDs and information including vehicle driving direction is passed to each adjacent node on both sides along the roadway. All vehicles on the roadway are tracked, including those that are not receiving control signals (i.e. not registered on the automated vehicle control distributed network 100) and those that are not automated vehicles.

The node 110 to node 110 communication is performed using Internet protocol (IP) packets and also to all automated vehicles that are registered in the automated vehicle control distributed network 100. IP packets may be delivered via broadcast, unicast or multicast as determined by the situation. For example, unicast Internet protocol (IP) packet delivery is used to directly control the vehicles. Driving instructions are based upon identified dangers, road conditions, and vehicle speeds and locations in the vicinity of the registered vehicle. Braking, acceleration and steering control signals may be based on this identified danger information, and transmitted to multiple vehicles using broadcast packets.

Multicast IP packet capabilities may be used for fleet vehicle control. For example, weather conditions may warrant that a message be sent to a truck fleet to establish a maximum speed. The multicast users also receive the broadcast packets. Broadcast IP packets are used to provide information to all registered vehicles to provide assistance information such as information on 3D sizes, moving direction, speed of all objects (vehicles, animal, human) for a current pole node 110 and its neighbor nodes. Data updates in the system occurs as fast as 20 milliseconds.

In one embodiment, efficient pattern recognition is achieved using the least squares method. In an example of capturing a vehicle with 8 xyz points, then comparing to a model of 8 XYZ points a score=sqrt $[(x_1-X_1)^2+(y_1-Y_1)^2+(z_1-Z_1)^2]$+sqrt $[(x_2-X_2)^2+(y_2-Y_2)^2+(z_1-Z_1)^2]+ \ldots$ +sqrt $[(x_8-X_8)^2+(y_8-Y_8)^2+(z_8-Z_8)^2]$ such that the lowest score will be the model. The node 110 processor is specially designed for up to 64-point least square methods and uses a logarithm algorithm to greatly reduce the multiple, divide, square, square root operations.

Figure 4:
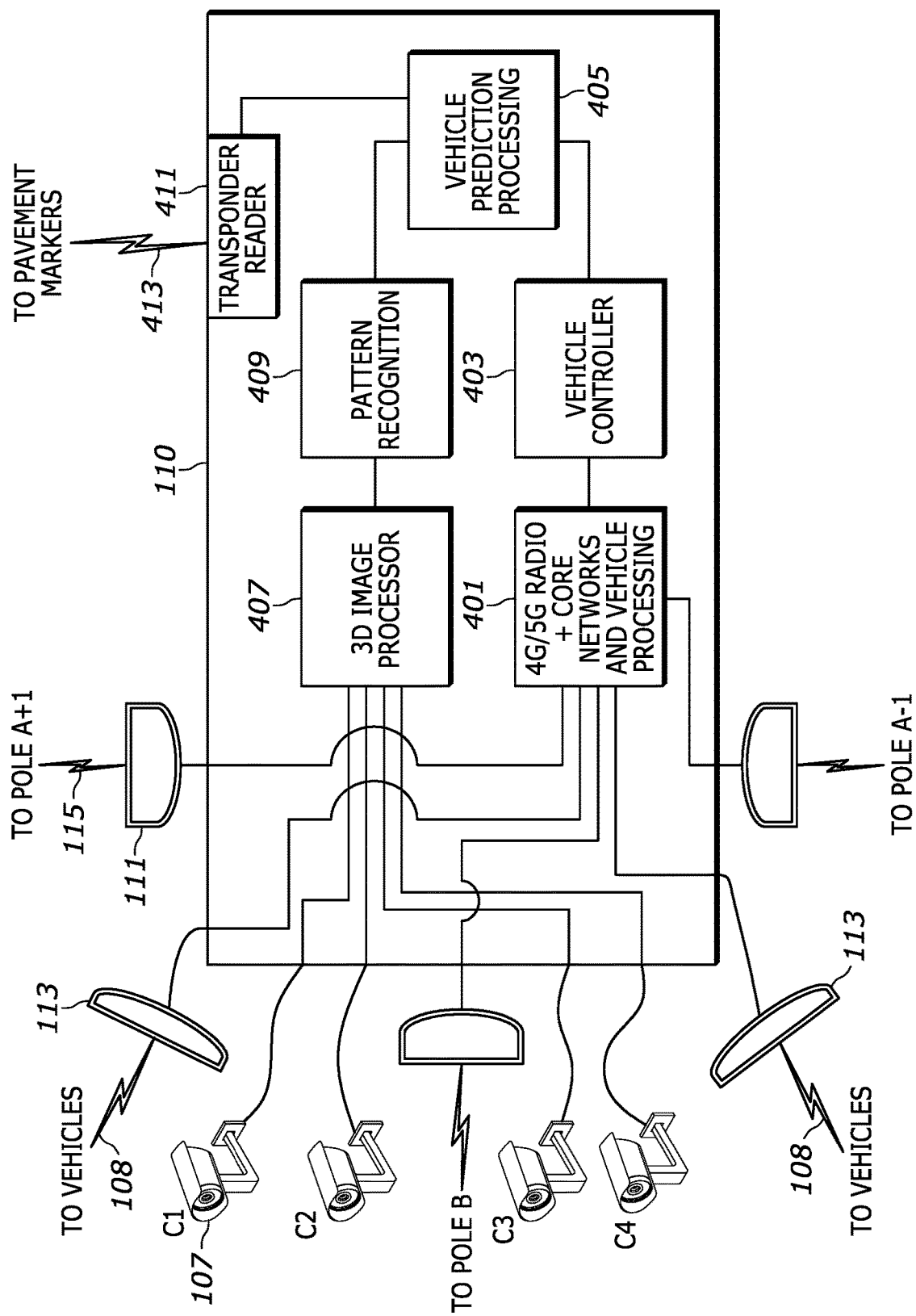
FIG. 4 is a diagram of a node in accordance with various embodiments.

FIG. 4 is a diagram of a node 110 in accordance with various embodiments. The automated vehicle control distributed network node 110 is one type of disclosed apparatus in accordance with various embodiments. Each node 110 includes cellular antennas 113 for communication with vehicles via the wireless links 108, and for sending control signals to the vehicles. The cellular antennas 113 may be antenna arrays and may be multiple-input and multiple-output (MIMO) antenna arrays. At least three modems 111 provide communication to neighboring adjacent nodes via a wireless communication link 115 or via a wired communication link or by a combination of both. As with wireless links 108, the wireless communication links 115 may be facilitated using MIMO antenna arrays in some embodiments. Cameras C1 through C4 are operatively coupled to the node 110 and to 3D image processing 407. The 3D image processing 407 feeds into pattern recognition 409 which, in turn, provides pattern recognition data to vehicle prediction processing 405.

A transponder reader 411 is operative to communicate with pavement marker 103 transponders via wireless link 413, to obtain environmental sensor data. The environmental sensor data is provided to the vehicle prediction processing 405 via operative coupling.

The node 110 may include any number of modems 111 and FIG. 4 is one example in which three modems 111 are present in the node 110. The three modems 111 are operatively coupled to a radio (for example 4G/5G) 4G/5G distributed core network and vehicle processing 401 which is further operatively coupled to a vehicle controller 403.

The vehicle controller 403 is operatively coupled to the vehicle prediction processing 405. Object identification and prediction data generated by the pattern recognition 409 and vehicle prediction processing 405 is shared with neighbor nodes via the wireless communication link 115 using the modems 111. The vehicle prediction processing 405 is operatively coupled to a vehicle controller 403 and is operative to communicate road conditions and object information. The vehicle prediction processing 405 and vehicle controller 403 are configured as a feedback system in which the vehicle prediction processing 405 detects vehicle position changes occurring in response to vehicle control signals send via the vehicle controller 403.

The vehicle controller 403 is operative to control vehicles by sending acceleration, deceleration and steering control signals over the wireless links 108 using the 4G/5G radio and 4G/5G distributed core network and vehicle processing 401. The 4G/5G radio and 4G/5G distributed core network and vehicle processing 401 is operatively coupled to the cellular antennas 113 to send the vehicle control signals over wireless links 108. The 4G/5G radio and 4G/5G distributed core network and vehicle processing 401 includes a 4G/5G radio and embedded distributed core network functions that enable the node 110 to operate as an independent entity in the distributed network such that, if other nodes 110 become disabled or are otherwise unavailable, full automated vehicle control is uninterrupted.

The various processing/processors in the node 110 may be implemented as System-on-a-Chip (SoC) systems and may include hardware, firmware and software to perform the various functions of the node 110.

Figure 5:
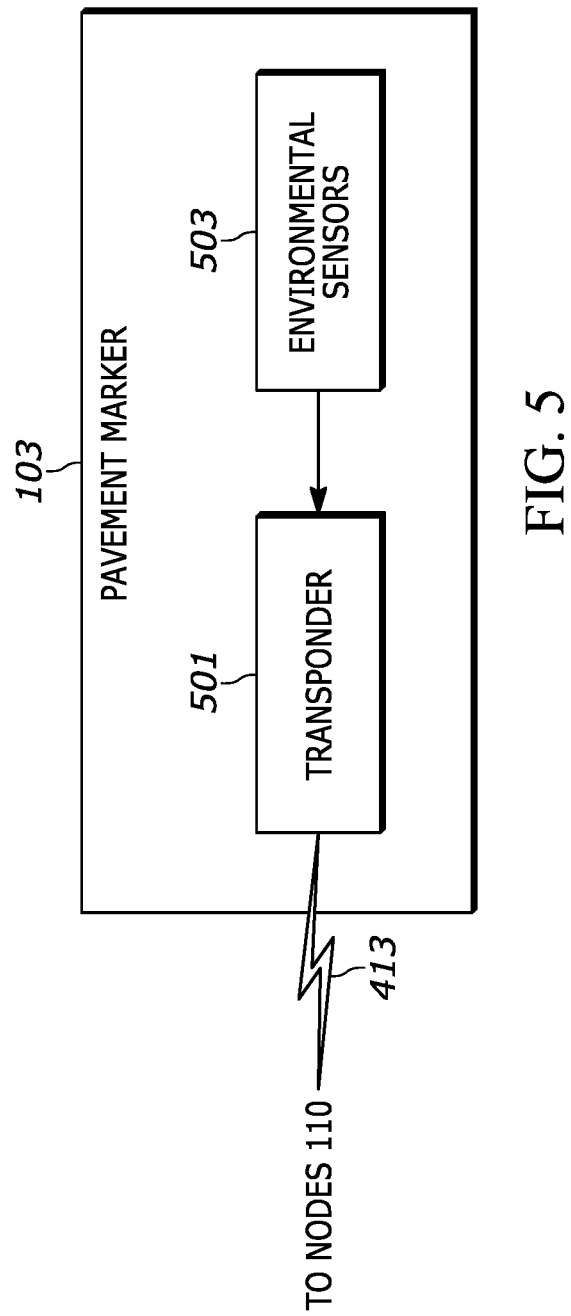
FIG. 5 is a diagram of a pavement marker in accordance with various embodiments.

FIG. 5 is a diagram of an example pavement marker 103 in accordance with various embodiments. The pavement marker 103 is one type of disclosed apparatus in accordance with various embodiments. The pavement marker 103 includes a transponder, which may be an RFID transponder, and environmental sensors that are operatively coupled to the transponder 501. The nodes 110 may extract environment sensor 503 data via communicating with the transponder 501. The environmental sensors may include, but are not limited to, temperature, moisture, pressure, inertia, etc.

Figure 6:
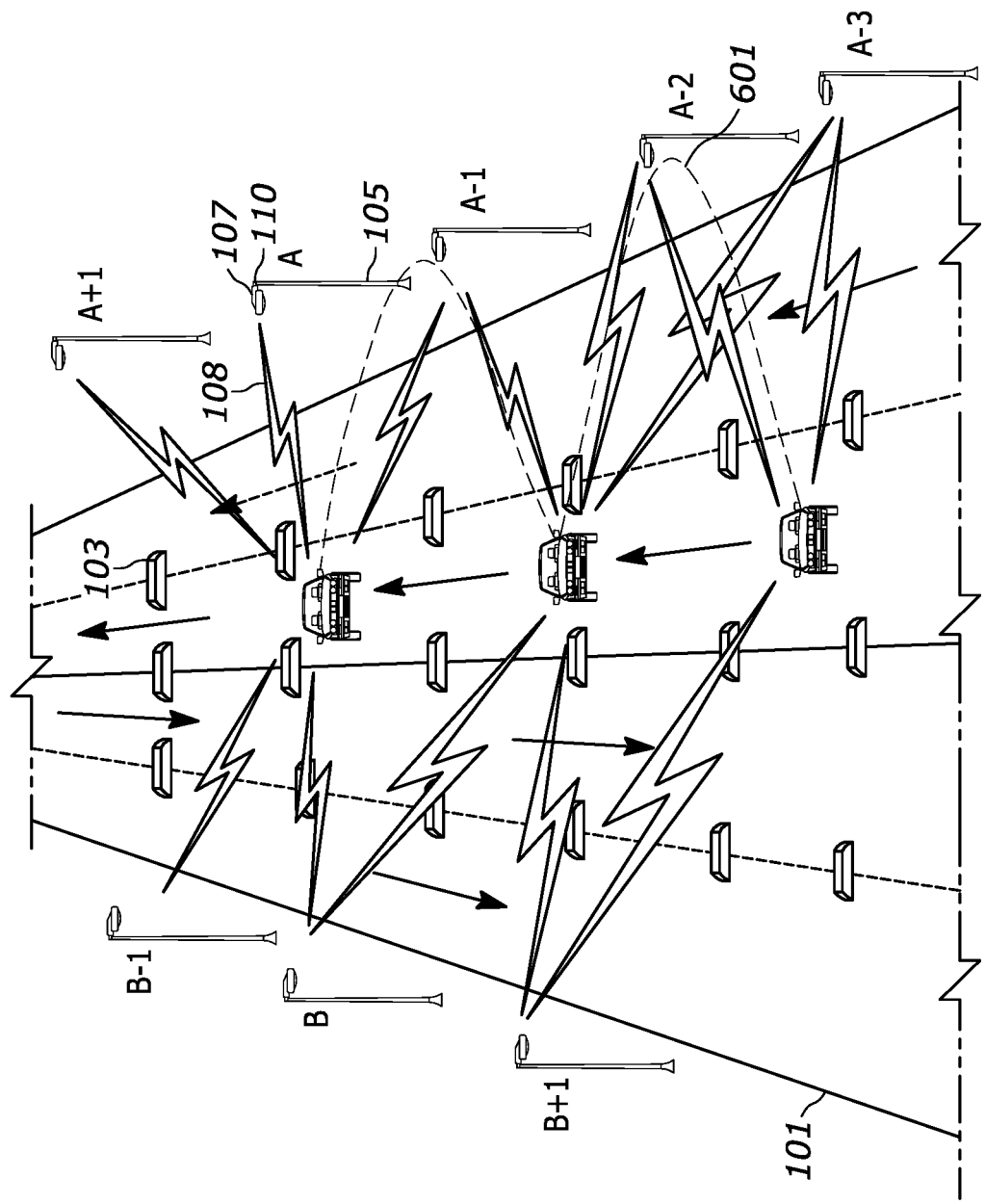
FIG. 6 is a diagram of a roadway showing automated vehicles in communication with the automated vehicle control distributed network and with each other in accordance with some embodiments.

FIG. 6 is a block diagram of a roadway 101 and showing automated vehicles in communication with the automated vehicle control distributed network 100 and with each other in accordance with some embodiments. Vehicle-to-vehicle communication 601 may be facilitated by the same pole 105 and node 110 or by adjacent poles/nodes. In some embodiments, each vehicle has 4+1 redundant links for reliability.

Figure 7:
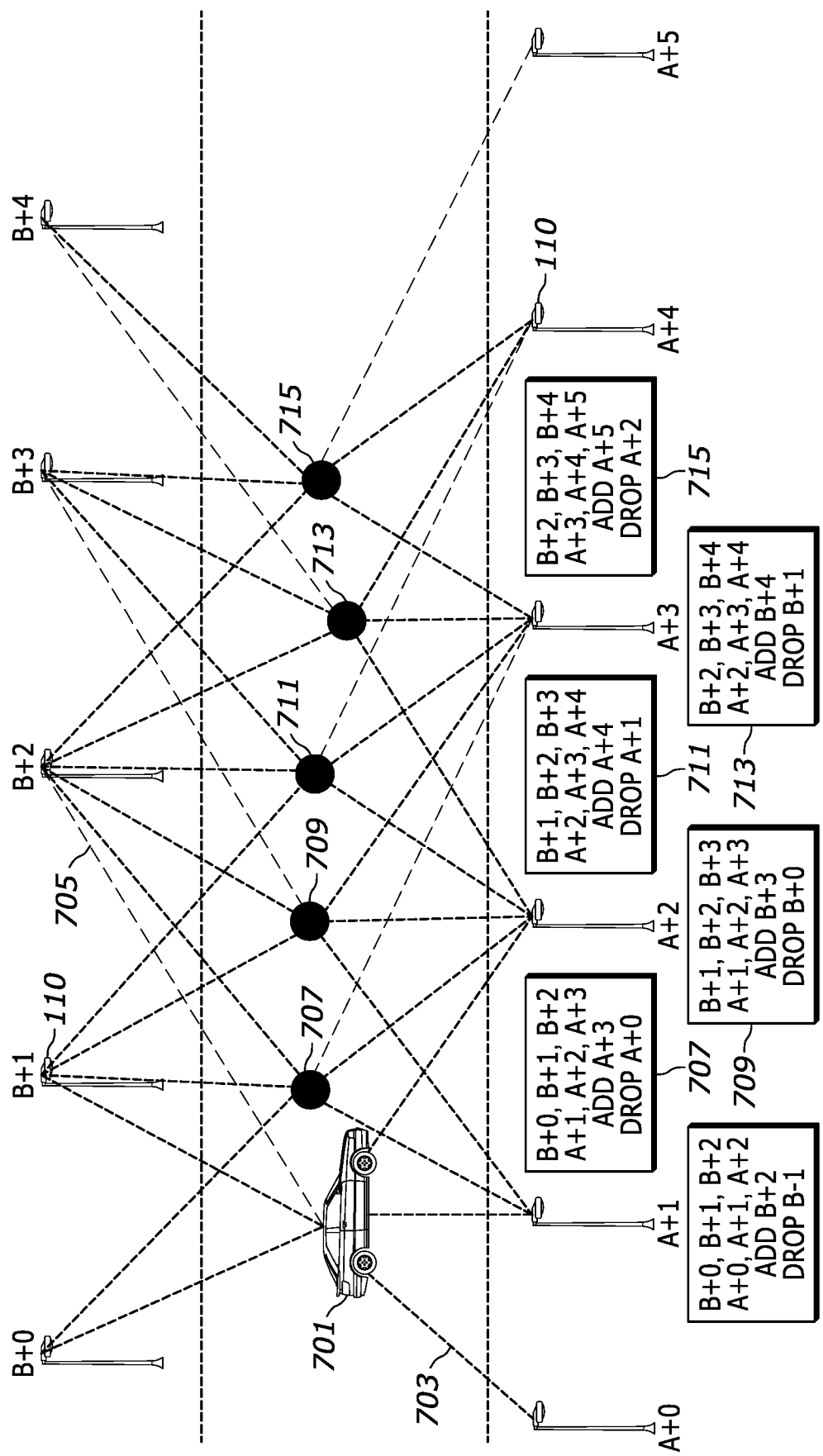
FIG. 7 is a diagram of a roadway showing automated vehicles handovers to various nodes of an automated vehicle control distributed network in accordance with some embodiments.

FIG. 7 is a diagram illustrating an automated vehicle 701 performing handovers to various nodes 110 of an automated vehicle control distributed network 100 along a roadway in accordance with some embodiments. The automated vehicle 701 maintains multiple wireless connections 703 with at least four nodes 110 at any given time and performs a make-before-break handover operation to additional upcoming nodes 110 as it moves along its travel path. In the example of FIG. 7, the automated vehicle 701 is initially in communication with five nodes; A+0, A+1, A+2, B+0, and B−1 (not shown). At the automated vehicle 701 current location it has established a new connection 705 with node B+2 and has dropped a previous connection with node B−1. As the automated vehicle 701 moves along the roadway to location 707, a make-before-break connection 705 is established with node A+3. Subsequent to establishing the node A+3 connection, the node A+0 connection is dropped. Moving to location 709, the automated vehicle 701 then establishes a connection to node B+3 and drops a connection to node B+0. Prior to location 711 the automate vehicles adds a connection to node A+4 and drops the connection to A+1. Prior to location 713 it adds a connection to node B+4 and drops the connection to node B+1. Prior to location 715 it adds a connection to node A+5 and drops the connection to node A+2, etc.

Figure 8:
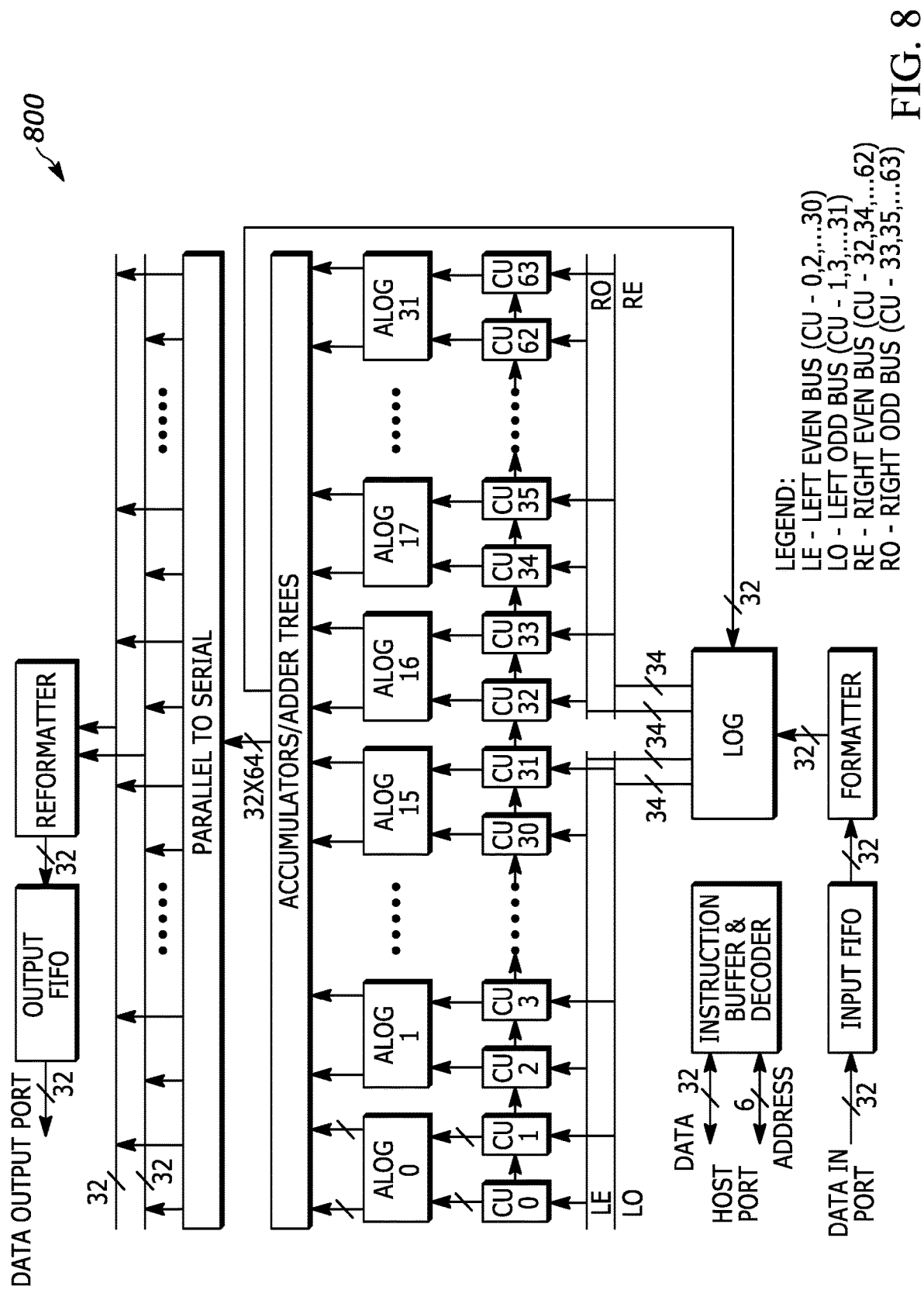
FIG. 8 is a diagram of a node processor operative for 100× enhanced pattern recognition of objects on a roadway in accordance with an embodiment.

FIG. 8 is a diagram of a node processor 800 in accordance with an embodiment. The node 110 processor 800 may perform the 3D image processing 407 and pattern recognition 409 and is specially designed for up to 64-point least square methods and uses a logarithm algorithm to greatly reduce the multiple, divide, square, square root operations. In some embodiments, the node processor 800 may also be used to implement the vehicle prediction processing 405, vehicle controller 403, the 4G/5G+ core networks and vehicle processing 401 or some combination of these. The 4G/5G+ core networks and vehicle processing 401, vehicle controller 403, vehicle prediction processing 405, 3D image processor 407, and/or pattern recognition 409, may each be implemented as one or more microprocessors, ASICs, FPGAs, microcomputers, microcontrollers, digital signal processors, central processing units, state machines, logic circuitries, and/or devices that manipulate signals based on operational instructions. Among other capabilities, one or more of the processors used to implement the node 110 is configured and operative to fetch and execute computer-readable instructions (i.e. executable instructions) stored in the memory (not shown) which may be separate non-volatile, non-transitory memory within the node 110 and/or on-board memory that is part of a SoC configuration or a combination of both. Regardless of specific implementations of the 4G/5G+ core networks and vehicle processing 401, vehicle controller 403, vehicle prediction processing 405, 3D image processor 407, and pattern recognition 409, each component is operatively coupled to communicated inputs and outputs as shown in FIG. 4 and are operable to execute any associated software and/or firmware including any required APIs (application programming interfaces) between such components. The 4G/5G+ core networks and vehicle processing 401 includes any needed wireless baseband hardware and software and is operative to execute an Internet Protocol (IP) stack and form multiple wireless IP connections with vehicles as well as with other nodes in order to share information, to send control commands and to receive feedback information. The 4G/5G+ core networks and vehicle processing 401 is a fully network infrastructure/architecture including all necessary 4G/5G radio and core network components/entities required to implement 4G/5G operational functions including maintaining redundant radio wireless links with controlled vehicles and implementing make-before-break radio handoffs for multiple vehicles.

Figure 9:
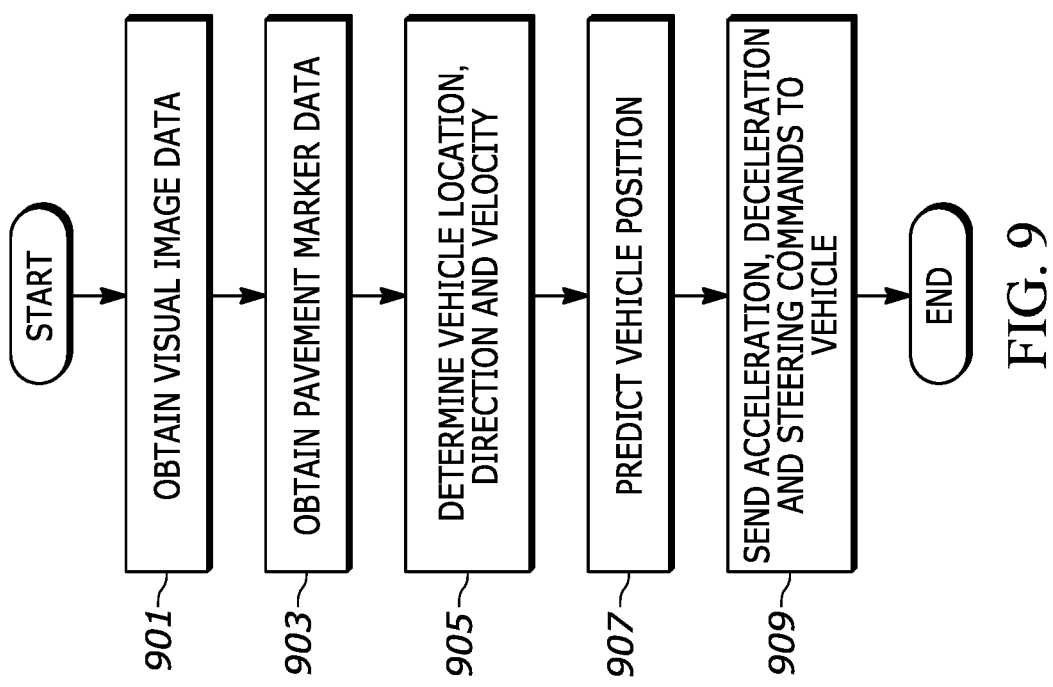
FIG. 9 is a flow chart showing a method of operation of an automated vehicle control distributed network in accordance with various embodiments.

FIG. 9 is a flow chart showing a method of operation of an automated vehicle control distributed network 100 in accordance with various embodiments. The method of operation begins, and in operation block 901 a node 110 of the automated vehicle control distributed network 100 obtains visual image data of a roadway. The visual image data captures vehicles as well as pedestrians, animals, objects in the roadway, and deformities in the pavement among other things. In operation block 903, the node 110 obtains environmental sensor data from the pavement markers 103. In operation block 905, the node 110 determines vehicle location, direction and velocity for a plurality of vehicles on the roadway. In operation block 907, the node 110 predicts vehicle position for all vehicles registered with the automated vehicle control distributed network 100. In operation block 909, the node 110 sends acceleration, deceleration and steering control signals to each registered vehicle.

Figure 10:
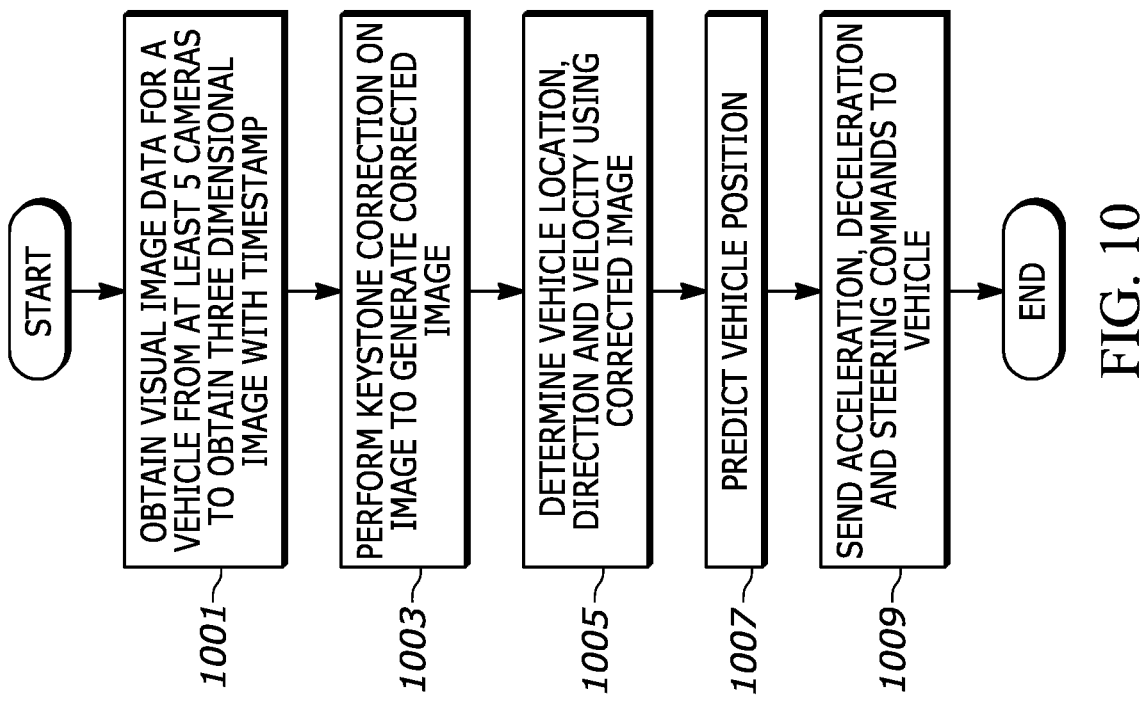
FIG. 10 is a flow chart showing a method of operation of an automated vehicle control distributed network in accordance with various embodiments.

FIG. 10 is a flow chart showing a method of operation of an automated vehicle control distributed network in accordance with various embodiments. The method of operation begins, and in operation block 1001 a node 110 of the automated vehicle control distributed network 110 obtains visual image data for vehicles from at least five cameras to obtain a three-dimensional image with timestamps per frame. In operation block 1003, the node 110 performs Keystone correction on the images to generate corrected images. In operation block 1005, the node 110 determines vehicle location, direction and velocity using the corrected images. In operation block 1007, the node 110 predicts vehicle position. In operation block 1009, the node 110 sends acceleration, deceleration and steering control signals to the vehicle.

FIG. 11 is a flow chart showing a method of operation of an automated vehicle control distributed network in accordance with various embodiments. The method of operation begins, and in operation block 1101, visual image data is obtained for a vehicle from multiple roadway nodes 110 with at least four cameras in each node to obtain three-dimensional image data with timestamps for each frame, in operation block 1103, each node 110 shares its image data with each neighboring node. In operation block 1105, each node 110 determines all vehicle object location, direction and velocity in its image data. In operation block 1107, each node 110 predicts vehicle position and identifies hazards that may be present in the roadway. In operation block 1109, a node 110 sends of acceleration, deceleration and steering control signals to the vehicle from the node 110.

Figure 12:
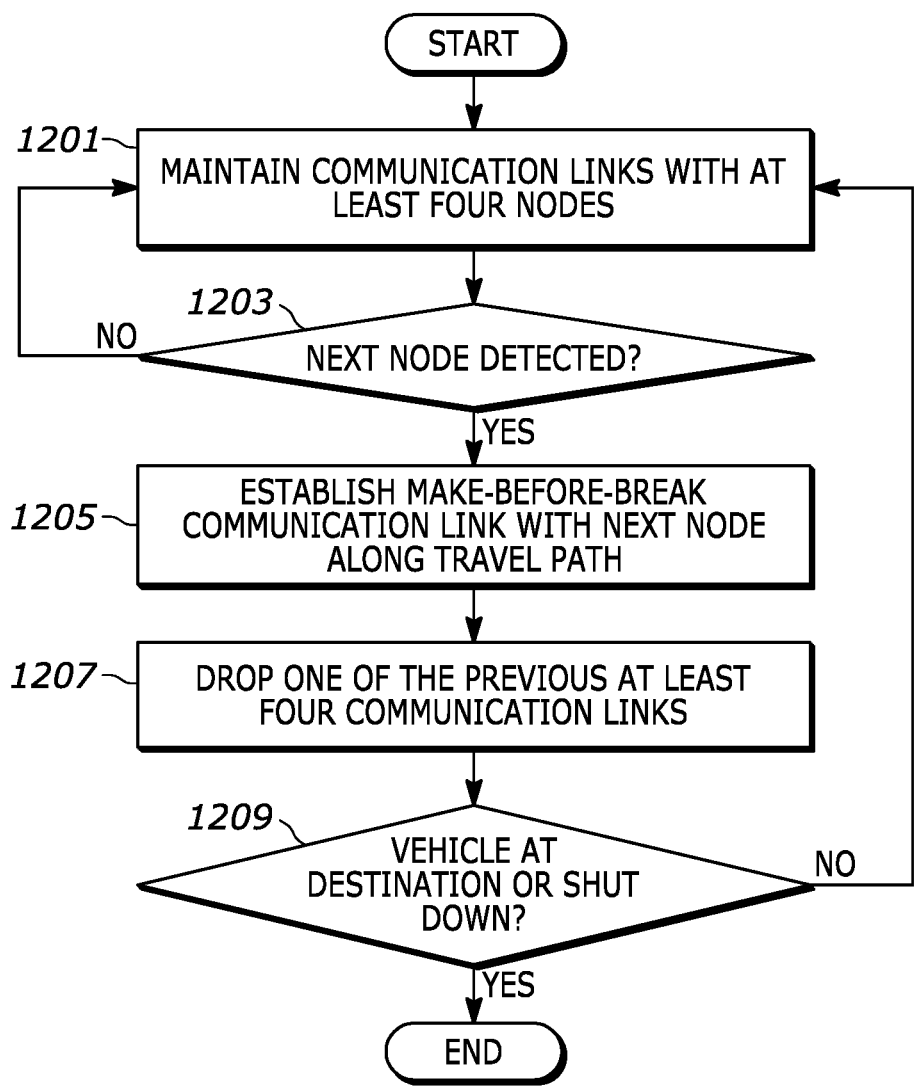
FIG. 12 is a flow chart showing a method of operation of automated vehicle handover between roadside nodes in accordance with various embodiments.

FIG. 12 is a flowchart showing a method of operation of automated vehicle handover between roadside nodes as illustrated in FIG. 7 in accordance with various embodiments. The process begins where an automated vehicle is traveling on a roadway and establishes and maintains a wireless communication link with at least four nodes as in operation block 1201. As the automated vehicle travels and passes additional roadside nodes 110, an increase in RSSI (Received Signal Strength Indicator) occurs as observed by the automated vehicle. Also, the RSSI of the automated vehicle increases as perceived by the radio transceivers of nodes 110 being approached by the automated vehicle. Thus, in decision block 1203, the automated vehicle may detect a next node by, for example, using a threshold RSSI value or some other communication link metric. In other words, RSSI is only one example metric and any other suitable communication link metric may be used for next node detection such as, but not limited to, bit error rate, frame error rate, frame erasure rate or some other metric, etc. Until a candidate next node meets the threshold metric requirement, the existing at least four wireless communication links are maintained in operation block 1201. Upon a next node candidate appearing in decision block 1203, the automated vehicle will establish a new make-before-break communication link with the candidate node in operation block 1205. After the communication link has been established, then in operation block 1207 the automated vehicle can drop one of the previous at least four communication links. Usually, the communication link having the lowest metric will be dropped. However, the farthest node from the vehicle may be dropped by default in some implementation. In decision block 1209, if the vehicle has been shut down such as when it has stopped, or has otherwise reached its destination and is no longer moving, the process terminates. Otherwise, the process continues in a loop at operation block 1201 until the vehicle stops moving.

Figure 13:
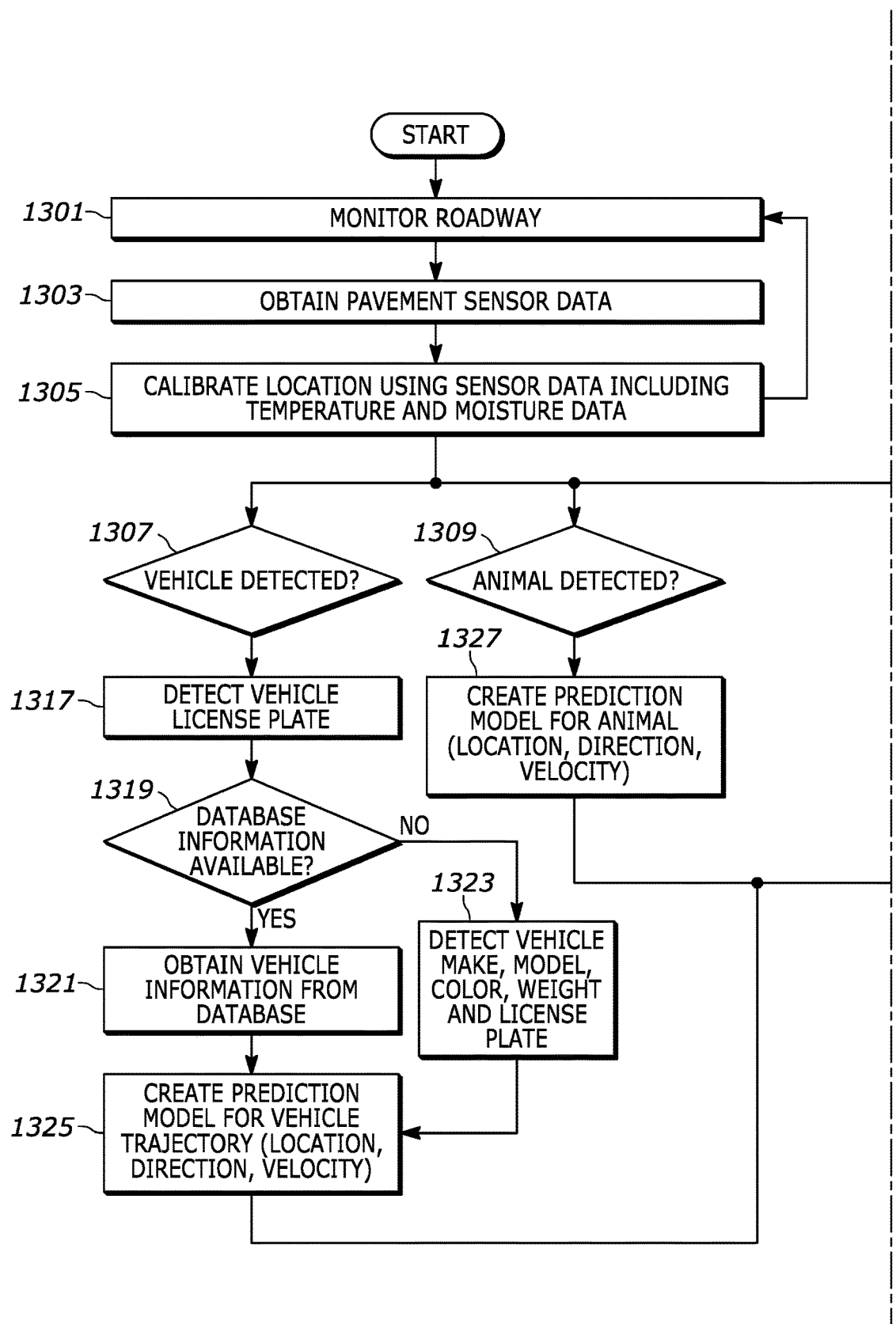
FIG. 13 is a flow chart showing a method of operation of an automated vehicle control distributed network in accordance with various embodiments.
Figure 13:
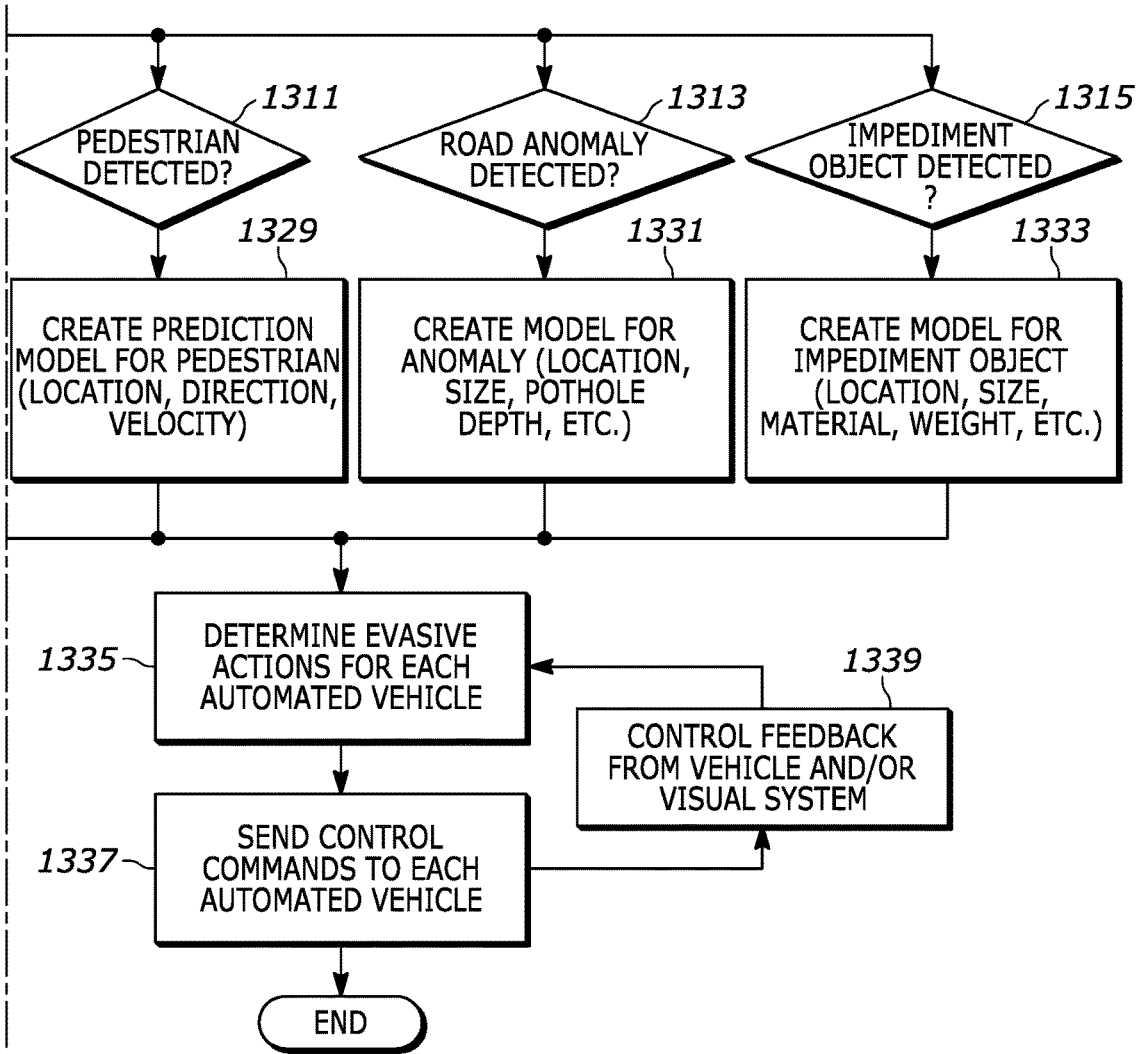

FIG. 13 is a flow chart showing a method of operation of an automated vehicle control distributed network in accordance with various embodiments. The method of operation begins and in operation block 1301 an automated vehicle control distributed network monitors all activity on a roadway. In operation block 1303 the automated vehicle control distributed network obtains sensor data from the pavement sensors via a wireless connection, and in operation block 1305 calibrates the pavement marker location using the sensor data. The sensor data may include, but is not limited to, temperature, moisture data, pressure data, etc.

The automated vehicle control distributed network then monitors all roadway activity including vehicles in decision block 1307, animals in decision block 1309, pedestrians in decision block 1311, road anomalies in decision block 1313, and impediment objects in decision block 1315. The process of each decision block continues indefinitely and continuously tracks all items on the roadway continuously.

If a vehicle is detected in decision block 1307, the automated vehicle control distributed network may detect the vehicles license plate in operation block 1317 and check the license plate number in a database in decision block 1319. Any vehicle information in the database is retrieved in operation block 1321. Otherwise, if there is no license plate on the vehicle or otherwise if no information is available in the database in decision block 1319, then in operation block 1323 the automated vehicle control distributed network will use the visual detection system to detect the vehicle make, model, color and weight. In operation block 1325 the automated vehicle control distributed network creates a prediction model using any database information and information from the visual detection system.

If an animal is detected in decision block 1309, then in operation block 1327 the automated vehicle control distributed network creates a motion prediction model for the animal. Likewise, if a pedestrian is detected in decision block 1311, then in operation block 1329 the automated vehicle control distributed network creates a motion prediction model for the pedestrian. If any road anomaly is detected in decision block 1313, then in operation block 1331 a model of the anomaly is created including features such as, but not limited to, location, size, pothole depth, etc. If an impediment object is detected in decision block 1315, then in operation block 1333, a model is created for the impediment including features such as, but not limited to, object size, material, weight, etc. to the extent detectable by the visual detection system in combination with information from the pavement sensors.

Based on all of the created prediction models, in operation block 1335 the automated vehicle control distributed network determines appropriate evasive action for each automated vehicle. Each automated vehicle is also modeled at operation block 1325. In operation block 1337 the automated vehicle control distributed network sends appropriate control commands to each automated vehicle in a coordinated manner such that all collisions are avoided. Feedback is obtained in operation block 1339 to make further course corrections for each automated vehicle.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An automated vehicle control distributed network node, comprising:
    at least two modems for communicating with two neighboring roadside nodes on a same side of a roadway;
    at least one antenna for communicating with vehicles via a wireless connection;
    pattern recognition processing operative to detect patterns using image data from a plurality of high speed, high resolution video cameras that include night vision;
    vehicle prediction processing, operatively coupled to the pattern recognition processing, operative to predict vehicle location, velocity and direction using the pattern recognition processing; and
    a vehicle controller, operatively coupled to the vehicle prediction processing to receive vehicle prediction data, and to the at least one antenna, operative to send acceleration, deceleration and steering control signals to a plurality of vehicles in response to vehicle prediction data received from the vehicle prediction processing.

2. The automated vehicle control distributed network node of claim 1, comprising:
    at least one high-speed high-resolution video camera that include night vision, operatively coupled to the pattern recognition processing.

3. The automated vehicle control distributed network node of claim 1, further comprising:
    at least a third modem for communicating with a third neighboring node across the roadway.

4. The automated vehicle control distributed network node of claim 1, further comprising:
    a radio, distributed core network and vehicle processing, operatively coupled to the at least two modems, to the at least one antenna, and to the vehicle controller.

5. The automated vehicle control distributed network node of claim 1, wherein the vehicle prediction processing is implemented using a machine learning algorithm.

6. An automated vehicle control distributed network, comprising a plurality of operatively coupled automated vehicle control distributed network nodes according to claim 1.

7. The automated vehicle control distributed network node of claim 1, wherein the pattern recognition processing is further operative to:
    detect missed points from the node image using image data from a neighboring node's cameras.

8. The automated vehicle control distributed network node of claim 4, wherein the radio, distributed core network and vehicle processing comprises a $4^{th}$ generation (4G) and ($5^{th}$ generation) (5G) radio access component and associated distributed core networks.

9. A method comprising:
    obtaining high speed, high resolution video data from a plurality of roadway cameras;
    determining vehicle location, direction and velocity for at least one vehicle using the high speed, high resolution video data;
    predicting position of the at least one vehicle; and
    sending acceleration, deceleration and steering commands to the vehicle based on the predicted position.

10. The method of claim 9, further comprising:
    obtaining the high speed, high resolution video data from at least one camera, mounted on a plurality of roadside poles, to obtain a three-dimensional image with timestamps.

11. The method of claim 10, further comprising:
    performing image correction on the three-dimensional image to generate a corrected image; and
    determining vehicle location, direction and velocity for at least one vehicle using the corrected image.

12. The method of claim 9, further comprising:
    sending the acceleration, deceleration and steering commands to a plurality of vehicles as unicast Internet protocol (IP) packets.

13. The method of claim 12, further comprising:
    sending acceleration, deceleration and steering commands to a plurality of vehicles as multicast Internet protocol (IP) packets.

14. The method of claim 9, further comprising:
    obtaining environmental data from a plurality of environmental sensors.

15. The method of claim 9, further comprising:
    obtaining environmental data from a plurality of environmental sensors via a pavement marker comprising the plurality of environmental sensors and a transponder, by communication with the transponder.

16. The method of claim 10, further comprising:

obtaining geo location data from a plurality of sensors via a pavement marker comprising the plurality of sensors and a transponder, by communication with the transponder; and calibrating the three-dimensional image using the geo location data.

17. A method comprising:

monitoring a roadway using a plurality of roadway high speed, high resolution cameras to detect vehicles, animals, pedestrians, road anomalies and impediment objects;

creating a prediction model for each detected vehicle, animal, pedestrian, road anomaly and impediment object;

determining control actions for at least one vehicle based on at least one prediction model; and sending acceleration, deceleration and steering commands to the at least one vehicle based on the determined control actions.

18. The method of claim 17, further comprising:

receiving control feedback via the plurality of roadway high speed, high resolution cameras for the at least one vehicle; and sending adjusted acceleration, deceleration and steering commands to the at least one vehicle based on the control feedback.

19. The method of claim 17, further comprising:

maintaining a plurality of wireless connections between the at least one vehicle and an automated vehicle control distributed network via a plurality of roadside nodes; and performing continuously a make before break wireless handoff to at least one additional roadside node by the at least one vehicle as the at least one vehicle travels along a roadway such that there is no communication delay between the at least one vehicle and the automated vehicle control distributed network.

20. The method of claim 19, further comprising:

sending the acceleration, deceleration and steering commands to the at least one vehicle redundantly using the plurality of roadside nodes.

\* \* \* \* \*